Patented Sept. 5, 1933

1,925,820

UNITED STATES PATENT OFFICE 1,925,820

CATALYST AND METHOD OF MAKING SAME

Lloyd H. Reyerson, Minneapolis, Minn., assignor to The Silica Gel Corporation, Baltimore, Md., a corporation of Maryland No Drawing. Application December 19, 1930
Serial No. 503,615

16 Claims. (Cl. 23—233)

The present invention relates to catalysts and processes of preparing the same.

The principal object of the present invention is to produce a catalyst consisting of a porous carrier material having at least two metals associated therewith.

Another object of the invention is to provide a process whereby a catalyst containing a plurality of metals may be produced in a simple and practical manner.

Briefly stated, the process comprises contacting a metal impregnated carrier with a solution of a salt of a metal below that of said metal in the electromotive force series, and allowing the impregnated carrier and metal salt solution to remain in contact for a sufficient time to permit an exchange between the metal ion of the salt solution and the metal of the carrier.

The carrier of the metal may consist of a material containing one or more hydrous oxides. By the term "hydrous oxides" is meant any hydrogel or jelly, and/or gelatinous precipitates, or mixtures of the two, of one or more of the oxides of silicon, germanium, tungsten, titanium, aluminum, tin, and the like, or the partially or nearly dehydrated hydrogels and/or gelatinous precipitates, or mixtures of the two, of one or more of said oxides, or mixtures of said oxides. Then again, it may consist of other materials such as kieselguhr, clay, or similar substances. The metal with which the carrier material is impregnated may be any metal which exhibits catalytic properties such as zinc, chromium, iron, cobalt, nickel, and the like.

The solution of a salt of a metal with which the metal impregnated carrier material is treated may be any soluble salt of a metal below that of the metal of the carrier material in the electromotive force series. Soluble salts of zinc, chromium, cadmium, iron, cobalt, nickel, tin, lead, copper, silver, mercury, platinum, palladium, or gold, may be employed, for instance, zinc chloride, chromic chloride, cadmium chloride, ferric chloride, nitrate, or sulphate, stannic chloride, lead chloride, copper sulphate or nitrate, silver nitrate, platinum chloride, mercury chloride, palladium chloride, may be used.

The strength of the metal salt solution with which the metal impregnated carrier is treated, is variable. The concentration of such solution is dependent upon the degree of displacement desired. It is preferred, however, to employ a concentrated solution since such solutions effect the electromotive chemical exchange in a much more rapid manner than if dilute solutions are used. Solutions of a concentration from about 0.1 normal to normal have been found to give satisfactory results.

The time period required to effect the exchange between the metal ion of the salt solution and the metal of the carrier material is dependent upon the degree to which the exchange of metals is desired. For example, where a complete exchange is desired, the metal impregnated carrier material may remain in contact with the metal salt solution for several days. If it is desired to effect only a partial exchange, then a shorter treatment is sufficient. It is preferred to regulate this treatment of the metal impregnated carrier material so that only a partial exchange between the metal ion of the salt and the metal of the carrier material takes place.

The product obtained by the process of this invention is particularly effective as a catalyst in commercial processes such as the hydrogenation of oils, dehydrogenation of alcohols, oxidation reactions, and chlorination of hydrocarbons.

Specific examples of the process according to this invention are as follows:

*Example 1*

A porous carrier material containing nearly dehydrated silica gel, is placed in a container, and then subjected to the action of a vacuum pump while heating same so as to drive off all of the adsorbed gases. When the gel has been completely evacuated it is cooled to room temperature or lower while maintaining it under a vacuum. At this point hydrogen gas is admitted in an amount sufficient to fill the vacuum. During the introduction of the hydrogen the receptacle is cooled to a temperature of from 15° to 30° below 0° C. The gel and hydrogen gas are allowed to stand at this temperature until complete equilibrium is obtained, that is, until the gel has adsorbed the maximum amount of hydrogen gas.

A solution of metal such as nickel nitrate is then introduced into the hydrogen filled container in an amount sufficient to submerge the gel. The metal salt solution employed may be of any degree of concentration, preferably a normal solution or less.

After the metal salt solution has been introduced into the container, the material may be agitated to insure thorough impregnation. The solution is allowed to remain in contact with the gel until the reaction is complete. Submersion for a number of hours, say 12 to 36 hours, is usually sufficient to complete the reaction. The nickel salt solution reacts with the hydrogen associated with the gel thereby causing the nickel to be deposited in an extremely finely divided condition.

The spent nickel salt solution is withdrawn from the container, and the impregnated gel is dried in the absence of air. If it is found that the nickel in the dried gel is only incompletely reduced to the metallic state, it may be completely reduced by heating the impregnated gel to a temperature of about 250° C. in the presence of hydrogen. As metallic nickel is readily oxidized, care must be exercised that it be not exposed to the air.

The gel impregnated with nickel is next treated with a solution of a salt of a metal below nickel in the electromotive force series, such as silver nitrate. This is done by immersing the nickel impregnated gel in a normal silver nitrate solution, and allowing same to remain therein for a sufficient time to permit the exchange between the silver ion of the silver nitrate solution and the nickel of the gel. The supernatant liquid is tested from time to time for nickel content. When the desired amount of nickel appears in the solution, the solution is separated from the gel as by draining. Usually soaking for a number of hours, say 18 to 36 hours, is sufficient to effect a partial exchange between the nickel of the gel and the silver ion of the silver nitrate solution. The gel is then dried in the usual manner.

The catalyst thus prepared consists of a carrier containing silica gel having a mixture of silver and nickel deposited in a finely divided state in the pores and on the surfaces thereof.

Example 2

A carrier material containing silica gel impregnated with nickel only, prepared in the manner described in Example 1, is immersed in a platinum chloride solution, and allowed to remain therein for a sufficient time to permit a partial exchange between the platinum ion of the platinum chloride and the nickel of the gel. The concentration of the platinum chloride solution employed may be a 0.5 normal or stronger solution. The gel is allowed to remain in the platinum chloride solution until a test of the solution shows the desired nickel content. Immersion for a number of hours, say 18 hours, is sufficient to effect the desired partial exchange between the platinum ion and the nickel. The gel is then removed from the solution, allowed to drain, and dried. The product consists of a carrier containing silica gel having nickel and platinum deposited in the pores and on the surfaces thereof.

Example 3

A carrier containing a hydrous oxide of silica is prepared in any of the known ways. For instance, equal volumes of solutions of sodium silicate (specific gravity of 1.1 to 1.3) and hydrochloric acid (10% solution by weight) are mixed together with agitation. According to the proportions taken and the order of mixing, a sol which coagulates after a time as a whole into a jelly or hydrogel or a gelatinous precipitate is formed. The hydrogel or gelatinous precipitate is washed thoroughly with water to free it of acid and salt.

The carrier containing the hydrous oxide of silica in a non-dehydrated state is treated with a solution of cobaltous chloride. The cobaltous chloride solution may be of any concentration, preferably a normal solution or less. This is done by submerging the carrier in the cobaltous chloride solution, and allowing same to remain therein for a time sufficient to impregnate the carrier, for example, 18 hours or more. The impregnated carrier is then taken out of the solution, placed upon a screen, and allowed to drain. It is then dried as by passing air heated to a temperature of 150° C. or higher through it. The dried carrier containing silica gel impregnated with cobalt oxide is then treated with hydrogen while still hot to reduce the oxide to the metal.

The dried impregnated carrier is next treated with a solution of a salt of a metal below cobalt in the electromotive force series, such as palladium chloride. This is effected by soaking the cobalt impregnated carrier in a normal palladium chloride solution for a sufficient time to permit the exchange between the palladium ion of the palladium chloride solution and the cobalt of the carrier. The supernatant liquid is tested from time to time for cobalt content. When the desired amount of cobalt appears in the solution, the solution is separated as by draining. Usually soaking for about 18 to 36 hours, is sufficient to complete a partial exchange between the cobalt and palladium ion of the palladium chloride solution. The carrier is then dried in the usual manner.

The product thus prepared consists of a carrier containing silica gel having a mixture of cobalt and palladium deposited in a finely divided state in the pores and on the surfaces thereof.

Example 4

A porous carrier material containing kieselguhr impregnated with nickel only, is prepared in the manner described in Example 1. It is then immersed in a copper nitrate solution, and allowed to remain therein for a sufficient time to permit a partial exchange between the copper ion of the copper nitrate solution and the nickel of the carrier. The concentration of the copper nitrate solution employed may be 0.7 normal or stronger. The carrier is allowed to remain in the copper nitrate solution until a test shows the desired nickel content. Immersion for about 24 hours is sufficient to effect the desired partial exchange between the nickel and the copper ion. The carrier is then taken from the solution, allowed to drain, and dried. The product comprises a carrier containing kieselguhr having nickel and copper deposited in the pores and on the surfaces thereof.

Various specified details of procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. The process of preparing catalysts consisting in contacting a metal impregnated carrier with a solution of a salt of a metal below that of the metal of the carrier in the electromotive force series, and allowing the carrier and metal salt solution to remain in contact for a sufficient time to permit an exchange between the metal ion of the salt solution and the metal of the carrier.

2. The process of preparing catalysts consisting in contacting a metal impregnated carrier with a solution of a salt of a metal below that of the metal of the carrier in the electromotive force series, allowing the carrier and metal salt solution to remain in contact for a sufficient time to permit an exchange between the metal ion of the salt solution and the metal of the carrier, separating the carrier from the solution, and drying the treated carrier.

3. The process of preparing a catalyst consisting in contacting a metal impregnated carrier including a hydrous oxide with a solution of a salt of a metal below that of the metal of the carrier in the electromotive force series, and allowing the carrier and metal salt solution to remain in contact for a sufficient time to permit an exchange between the metal ion of the salt solution and the metal of the carrier.

4. The process according to claim 3 wherein the hydrous oxide is silica.

5. The process of preparing a catalyst consisting in contacting a metal impregnated carrier including a hydrous oxide with a solution of a salt of a metal below that of the metal of the carrier in the electromotive force series, allowing the carrier and metal salt solution to remain in contact for a sufficient time to permit an exchange between the metal ion of the salt solution and the metal of the carrier, separating the carrier from the solution, and drying the treated carrier.

6. The process according to claim 5 wherein the hydrous oxide is silica.

7. The process of preparing a catalyst consisting in impregnating a carrier including a non-dehydrated hydrous oxide with a salt of a catalytically active metal, drying the impregnated carrier and converting the metal salt into the metal, contacting the metal impregnated carrier with a solution of a salt of a metal below that of the metal of the carrier in the electromotive force series, and allowing the carrier and metal salt solution to remain in contact for a sufficient time to permit an exchange between the metal ion of the salt solution and the metal of the carrier.

8. The process of preparing a catalyst consisting in impregnating a carrier including a non-dehydrated hydrous oxide with a salt of a catalytically acting metal, drying the impregnated carrier and converting the metal salt into the metal, contacting the metal impregnated carrier with a solution of a salt of a metal below that of the metal of the carrier in the electromotive force series, allowing the carrier and metal salt solution to remain in contact for a sufficient time to permit an exchange between the metal ion of the said solution and the metal of the carrier, separating the carrier from the solution, and drying the treated carrier.

9. The process of preparing catalysts consisting in contacting a material including a hydrous oxide impregnated with nickel with a solution of a soluble salt of copper, allowing the material and copper solution to remain in contact for a sufficient time to permit a partial exchange between the copper ion of the copper salt solution and the nickel of the material, and drying the treated material.

10. The process according to claim 9 wherein the hydrous oxide is that of slicia.

11. The process of preparing catalysts consisting in contacting a material including a hydrous oxide impregnated with nickel with a solution of a soluble salt of silver, allowing the material and silver solution to remain in contact for a sufficient time to permit a partial exchange between the silver ion of the silver solution and the nickel of the material, and drying the treated material.

12. The process according to claim 11 wherein the hydrous oxide is silica.

13. The process of preparing catalysts consisting in contacting a material including a hydrous oxide impregnated with nickel with a a solution of a soluble salt of platinum, allowing the material and platinum solution to remain in contact for a sufficient time to permit a partial exchange between the platinum ion of the platinum solution and the nickel of the material, and drying the treated material.

14. The process according to claim 13 wherein the hydrous oxide is silica.

15. A catalyst consisting of a porous material having at least two metals deposited in the pores and on the surfaces of said material, at least one of said metals being introduced by ionic displacement of another metal already contained in said porous material.

16. A catalyst consisting of a hard, porous material including a gel having at least two metals distributed in the pores and on the surfaces of the gel, at least one of said metals being introduced by ionic displacement of another metal already contained in said porous material.

LLOYD H. REYERSON.